Oct. 11, 1938.  R. P. SIMMONS  2,133,050
SUCKER ROD AND COMBINED COUPLING AND TORSION JOINT THEREFOR
Filed June 17, 1936
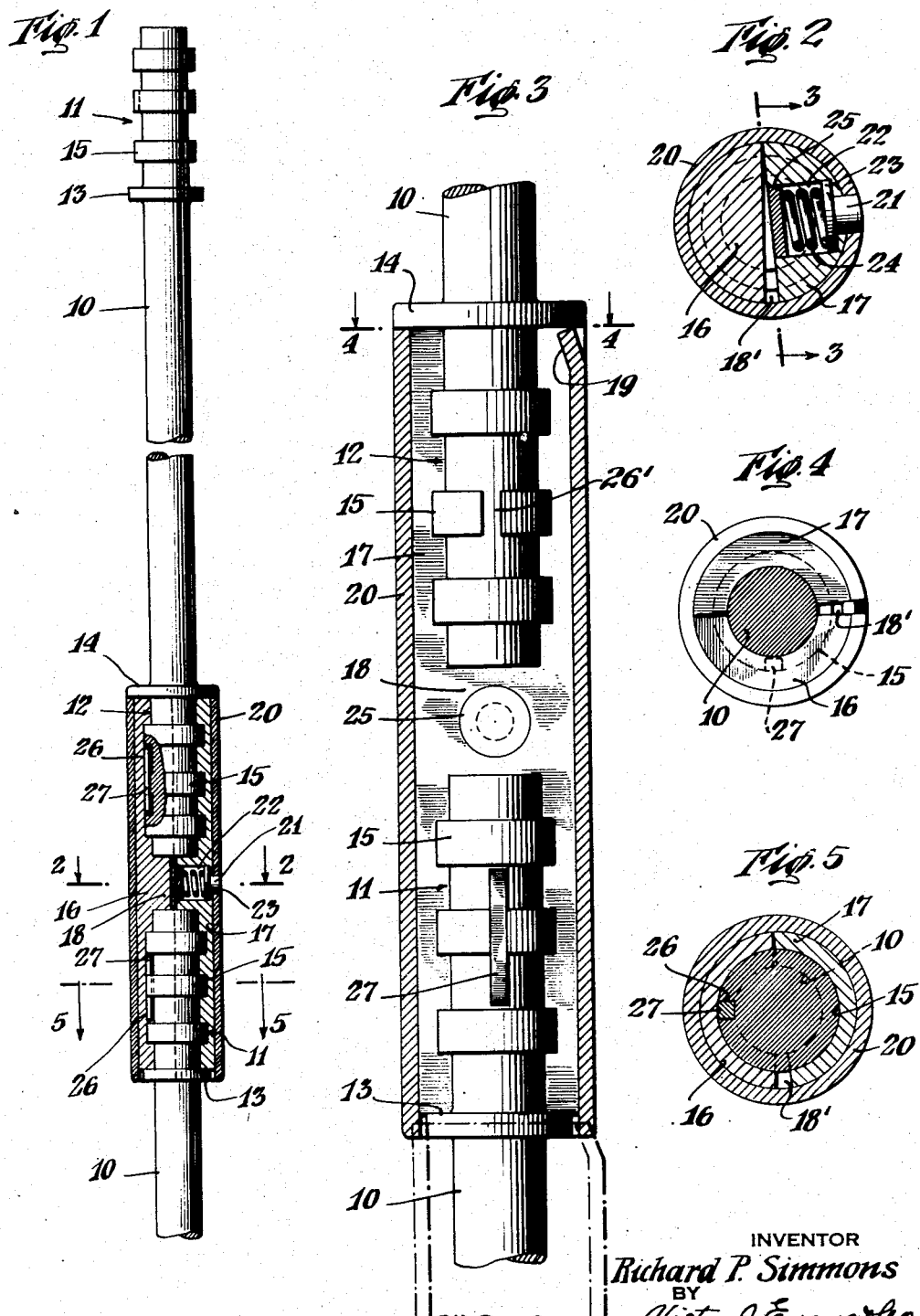
INVENTOR
Richard P. Simmons
BY
Victor J. Evans & Co
ATTORNEYS Patented Oct. 11, 1938

2,133,050

UNITED STATES PATENT OFFICE 2,133,050

SUCKER ROD AND COMBINED COUPLING AND TORSION JOINT THEREFOR

Richard P. Simmons, Laurelton, N. Y.

Application June 17, 1936, Serial No. 85,773

4 Claims. (Cl. 287—111)

The application is a continuation in part of application No. 675,325 filed June 10, 1933 which, on July 7, 1936 eventuated into Patent No. 2,046,348.

The object of the present invention is to provide a combined coupling and torsion joint for sucker rods of well pumping apparatus that will make possible the coupling of the rod sections without the necessity for the use of tools; that will provide for the coupling and uncoupling operation in a minimum time and without the necessity for skill on the part of the user; to provide a sucker rod coupling so constructed that it will readily stand the maximum tensile strain that can or will be withstood by the rod sections themselves; to provide a coupling which will permit relative free turning of the connected sections on their own axes; to provide a coupling of the kind indicated in which the relative turning of the connected sections resulting from the whip to which they are subjected in practice will result in minimum friction by reason of the peculiar construction of the coupling; to provide a sucker rod coupling in which connected sections of the rod may be locked to preclude relative angular or turning movement when such an arrangement is desired; to provide a sucker rod assembly which combines lightness of construction with maximum strength so as to preclude loss from enforced periods caused by equipment failure and conventionally referred to as "down time"; and generally to provide a combined coupling and torsion joint which is of simple form and therefore of comparatively cheap manufacture.

With this object in view, the invention consists in a construction and combination of parts of which a preferred embodiment is illustrated in the accompanying drawing, wherein:

Figure 1 is a part of a sucker rod in which the invention is incorporated as a coupling element, the coupling being shown in section.

Figure 2 is a transverse sectional view on the plane indicated by the line 2—2 of Figure 1.

Figure 3 is a longitudinal sectional view on the plane indicated by the line 3—3 of Figure 2.

Figure 4 is a transverse sectional view on the plane indicated by the line 4—4 of Figure 3.

Figure 5 is a transverse sectional view on the plane indicated by the line 5—5 of Figure 1.

Deviation from verticality in oil wells results in a whip being given to the sucker rod in the pumping operation and in fact this is present under conditions of substantial verticality when the well is of material depth. The sucker rod is therefore subjected to considerable torsional strain with the result that it is severed from the continual twist to which it is subjected even though it be otherwise sufficient to stand the tensile strain for a considerable period of time. The present invention, aside from providing for the quick coupling of sucker rod sections without the necessity for the use of tools in such operation, obviates the twisting action or effect by providing for relative turning of the rod sections on their own axes. To this end each rod section 10 is formed at its extremities with the coupling elements 11 and 12 which, while they may be made separately from the rod section and connected to the latter by any conventional method of connection, are preferably integral elements of the section, so that the only joints in an assembled sucker rod will exist in the improved coupling.

The coupling elements 11 and 12 are identical except in the diameters of the fixed collars 13 and 14, the latter being of greater diameter than the former for a purpose hereinafter appearing.

The coupling elements 11 and 12 are provided by fabricating the rod section with enlarged ends which are machined to form the fixed collars 13 and 14 at fixed distances from the extremities and the spaced comparatively wide fixed collars 15 which constitute series of annular shoulders for engagement with complemental coupling elements.

Semi-cylindrical coupling sections 16 and 17 are employed to connect adjacent rod sections 10 together and these are arranged in embracing relation to the coupling element 11 of one section and the coupling element 12 of the next, being formed with bores from opposite ends of which the elements 11 and 12 are received. The bores are formed half in the element 16 and half in the element 17, being of the diameter of the elements 11 and 12 between the collars 15 but enlarged at the points of location of said collars to the diameter of the latter, so that the elements 16 and 17 snugly engage the elements 11 and 12 but leave the ends thereof spaced by reason of the intervening web portions 18.

Sufficient stock is removed from the facing sides of the elements 16 and 17 to reduce their cross section enough below the half circle to permit the one to be slid around to engage the other on one side which will result in leaving a space between the two on the diametrically opposite side which provides a key way, as indicated at 18', in which a key 19 is received, the latter being an integral part of the sleeve 20 and formed at one end thereof by slitting the sleeves on spaced lines and depressing the intervening stock inward.

The sleeve 20 constitutes the assembly retaining medium and can readily be applied by first slipping it on one rod section 10 over the collar 13 whose diameter is the internal diameter of the sleeve as well as the external diameter of the assembled elements 16 and 17. With the sleeve on the one rod section and the section to be coupled aligned with the latter, the elements 16 and 17 are applied so as to be in contact on the one side and spaced on the opposite side. Then, the key 19 entering the key way 18', the sleeve may be slid over the elements 16 and 17 and will completely enclose the latter when it abuts the collar 14 of the coupled section, this collar 14 being of the same diameter as the external diameter of the sleeve.

To retain the sleeve in position when in enclosing relation to the coupling elements 16 and 17, a latch pin 21 is provided, this pin entering a hole formed in the sleeve for its reception. The pin is carried by the element 17 in a socket formed in the web portion 18 of the latter, the socket being counterbored as indicated at 22 so as to provide a shoulder against which the head 23 of the pin may engage and into contact with which it is normally impelled by a compression spring 24 compressed between the head of the pin and a plug 25 closing the socket. The sleeve may be readily removed by depressing the pin 21 with the finger until it clears the inner surface of the sleeve which will allow the sleeve being slid back over the collar 13.

Under certain conditions, it is desirable that relative turning movement of the rod sections be prevented and to provide for this, key ways 26 and 26' are formed in one of the elements 16 or 17, say element 16, and in the elements 11 and 12, and keys 27 may be inserted in these key ways to lock or secure the several elements from relative angular or turning movement. Thus to employ the invention as a mere coupling in which the rod sections are secured against relative turning movement, the keys are employed, but when it is to combine the functions of a torsion joint with the coupling function, the keys are removed.

By reason of the fact that there is no direct connection between the elements 11 and 12, friction is reduced to a minimum when the invention is functioning as a torsion joint because the particular construction provides for only half the friction that would be present were the elements directly connected. The element 12 may turn with respect to the elements 16 and 17, as may also the element 11. Thus in relative angular movement of the elements 11 and 12 of, say, 90° the elements 16 and 17 would turn angularly half this distance, since the elements 11 and 12 may both turn angularly with respect to the elements 16 and 17. Thus the wear due to friction is reduced to a minimum.

But the particular form of coupling also provides maximum tensile strength at the point of connection of the rod sections because of the use of plural collars 15 and because of the rod, between such collars, not being reduced below the diameter of the major portion of the rod.

The invention having been described, what is claimed as new and useful is:

1. A sucker rod coupling comprising axially aligned members circumferentially reduced at spaced points to provide a series of spaced fixed collars, a pair of coupling members spanning the axially aligned members and having a bore formed jointly in them and enlarged at spaced points to receive said collars, and a sleeve arranged in embracing relation to said coupling members, the coupling members cross sectionally being less than a half circle so that when the adjacent edges on one side are in contact the corresponding edges on the diametrically opposite side will be spaced to form a key way, and the sleeve having a key engageable in said key way.

2. A sucker rod coupling comprising axially aligned members circumferentially reduced at spaced points to provide a series of spaced fixed collars, a pair of coupling members spanning the axially aligned members and having a bore formed jointly in them and enlarged at spaced points to receive said collars, and a sleeve arranged in embracing relation to said coupling members, the coupling members cross sectionally being less than a half circle so that when the adjacent edges on one side are in contact the corresponding edges on the diametrically opposite side will be spaced to form a key way, and the sleeve having a key engageable in said key way, and a spring impelled latch pin carried by one of the coupling members and engageable in the hole in the sleeve in the coupling embracing position of the latter.

3. A sucker rod coupling comprising axially aligned members circumferentially reduced at spaced points to provide a series of spaced fixed collars, a pair of coupling members spanning the axially aligned members and having a bore formed jointly in them and enlarged at spaced points to receive said collars, and a sleeve arranged in embracing relation to said coupling members, the coupling members cross sectionally being less than a half circle so that when the adjacent edges on one side are in contact the corresponding edges on the diametrically opposite side will be spaced to form a key way, and the sleeve having a key engageable in said key way, and a spring impelled latch pin carried by one of the coupling members and engageable in the hole in the sleeve in the coupling embracing position of the latter, one of the axially aligned members having a fixed collar of the same diameter as the exterior of the sleeve and spaced from the extremity of the member to provide an abutment for the sleeve and the other aligned member having a correspondingly spaced fixed collar of a diameter equal to the interior diameter of the sleeve to permit sliding movement of the sleeve thereover.

4. A sucker rod coupling comprising axially aligned members circumferentially reduced at spaced points to provide a series of spaced fixed collars, a plurality of coupling members spanning the axially aligned members and having a bore formed jointly in them and enlarged at spaced points to receive said collars, the coupling members being of such angular dimensions that their sum circumferentially is less than 360° whereby said members are spaced at their adjacent edges, a sleeve arranged in embracing relation to said coupling members and having a key engageable in the space between them and latching means securing the sleeve and coupling members against relative axial movement.

RICHARD P. SIMMONS.